(No Model.)
C. R. SMITH.
BALE TIE BUCKLE.
No. 297,859. Patented Apr. 29, 1884.
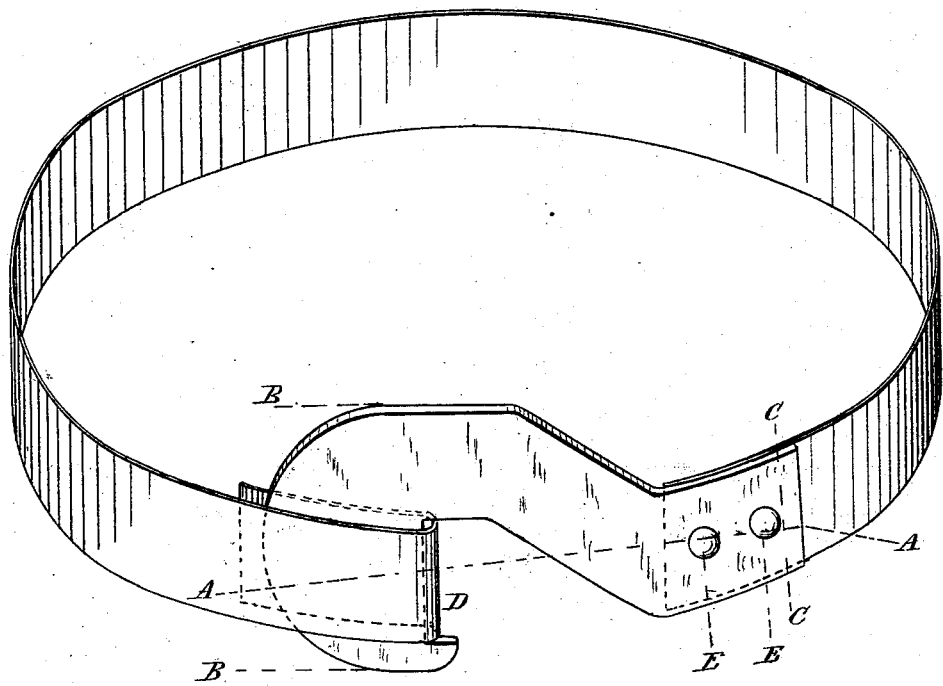
Witnesses:
J. C. Brecht
R. K. Evans
Inventor
Chas. R. Smith

UNITED STATES PATENT OFFICE.

CHARLES R. SMITH, OF OKOLONA, MISSISSIPPI.

BALE-TIE BUCKLE.

SPECIFICATION forming part of Letters Patent No. 297,859, dated April 29, 1884.

Application filed March 19, 1884. (No model.)

*To all whom it may concern:*

Be it known that I, CHARLES R. SMITH, a citizen of the United States, residing at Okolona, in the county of Chickasaw and State of Mississippi, have invented certain new and useful Improvements in Bale-Ties; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.
The object and nature of the invention is to furnish a cheap, easily-managed, and durable fastening for cotton-bale ties. I attain this object by the device illustrated in the accompanying drawing, in which the figure represents a perspective view.

Line from A to A indicates the whole length of the buckle—four and one-half inches—and line from B to B indicates widest point of the buckle—two inches. Line from C to C indicates width of the buckle—one inch. Line from D to D indicates width of hook—one inch—which is five-sixteenths inch deep where the tie rests when in position on cotton-bale. E E indicate the two holes for bradding the tie to the buckle, which are three-sixteenths 30 inch apart and five-sixteenths inch from end buckle.

The operation is as follows: The band is placed around the compressed bale, a loop is formed at the free end of the band, and the hook inserted into the loop.

Having described the invention, what I claim as new is—

The herein-described bale-fastening device, consisting of the strap or band proper and the hook-shaped tie-piece, rigidly connected to said band, substantially as described.

CHAS. R. SMITH.

Witnesses:
  W. W. SMITH,
  T. G. THOMPSON.